(12) United States Patent
Wuthnow (10) Patent No.: US 8,543,169 B1
(45) Date of Patent: Sep. 24, 2013

(54) LOCATION BASED CALLER IDENTIFICATION

(75) Inventor: Mark Wuthnow, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 502 days.

(21) Appl. No.: 11/623,451

(22) Filed: Jan. 16, 2007

Related U.S. Application Data (60) Provisional application No. 60/759,997, filed on Jan. 18, 2006.

(51) Int. Cl.
*H04M 1/00* (2006.01)

(52) U.S. Cl.
USPC ........ 455/567; 455/415; 455/414.2; 455/445; 379/211.02; 379/201.01

(58) Field of Classification Search
USPC .................... 455/414.1, 415, 416; 379/67.1, 379/88.11, 88.19, 88.2, 88.21
See application file for complete search history.

(56) References Cited

U.S. PATENT DOCUMENTS

| | | | |
|---|---|---|---|
| 7,047,019 B1 * | 5/2006 | Cox et al. | 455/456.1 |
| 7,286,799 B2 * | 10/2007 | Thrasher | 455/41.2 |
| 7,496,190 B1 * | 2/2009 | Kung et al. | 379/211.02 |
| 7,715,790 B1 * | 5/2010 | Kennedy | 455/41.2 |
| 2004/0185839 A1 * | 9/2004 | Seligmann et al. | 455/417 |
| 2006/0072726 A1 * | 4/2006 | Klein et al. | 379/201.01 |
| 2006/0142012 A1 * | 6/2006 | Kirchhoff et al. | 455/445 |
| 2007/0053653 A1 * | 3/2007 | Huntington | 386/46 |

* cited by examiner

Primary Examiner — Marcos Batista
Assistant Examiner — Keith Fang
(74) Attorney, Agent, or Firm — Hartman & Citrin LLC (57) ABSTRACT

Systems and methods are described herein for selectively displaying mobile caller identification (MCID) information for an incoming mobile telephone call on one or more display devices based on a location of the destination mobile device. A location of the destination mobile device can be compared to a display condition for one or more display devices. If the display condition is met for the given device, MCID information for the incoming call is provided to and displayed on the display device. The display condition can be based on the proximity of the mobile destination device and the display device.

20 Claims, 11 Drawing Sheets

| BROWSER | | | | | 705 | – □ ✕ |
|---|---|---|---|---|---|---|
| FILE | EDIT | VIEW | GO | BOOKMARKS | TOOLS | HELP |

← → ⟳ 🛑 🏠 http://www.mcidsp.com/subscriber=johndoe  710

WELCOME TO MCID SP CONFIGURATION JOHN!

☐ Enable Allowlist (block all other numbers)

☒ Enable Blocklist (exclude these numbers)      715

☒ Enable Nickname Conversion

720  [SUBMIT]

View: [PREFERENCES] 750   [SETUP] 745    725

Preferences:

| NUMBER | TEXT | NICKNAME | ALLOWLIST | BLOCKLIST | 735 |
|---|---|---|---|---|---|
| 123-456-7890 | | Mom | ☒ | ☐ | EDIT |
| | *MARKET* | | ☐ | ☒ | EDIT |
| | *SURVEY* | | ☐ | ☒ | EDIT |
| | John (and) Smith | Stumpy | ☒ | ☐ | EDIT |
| 205* | | Alabama | ☐ | ☐ | EDIT |
| | *Jones* | | ☒ | ☐ | EDIT |
| | *Florist* | | ☐ | ☒ | EDIT |
| | | | | | ADD |

BROWSER

FILE   EDIT   VIEW   GO   BOOKMARKS   TOOLS   HELP http://www.mcidsp.com/subscriber=johndoe

WELCOME TO MCID SP CONFIGURATION JOHN!

☐ Enable Allowlist (block all other numbers)

☐ Enable Blocklist (exclude these numbers)

☐ Enable Nickname Conversion

SUBMIT

View:   PREFERENCES  750    SETUP  745    725

SETUP:

LOCATIONS

HOME      EDIT  905

OFFICE    EDIT              NEW LOCATION  910

LOCATION BASED CALLER IDENTIFICATION

RELATED APPLICATIONS

This application claims priority to U.S. Application No. 60/759,997 filed Jan. 18, 2006, the entirety of which is incorporated herein by reference.

TECHNICAL FIELD

This invention relates generally to the delivery of mobile device caller identification information on remote displays based on a location of a mobile device.

BACKGROUND OF THE INVENTION

Caller Identification service (Caller ID) for conventional public switched telephone networks (PSTN) is a widely used and popular feature. Caller ID delivers information to a call recipient regarding the identity of the party attempting to place a call. As is known in the art, caller ID information is typically delivered to the call recipient between the first and second telephone rings of an incoming call. The caller ID information can include the telephone number from which the calling party is placing the call or can include both the telephone number and the name of the entity associated with that number in telephone company records. Typically, the feature is provided to subscribers at an additional cost.

If the recipient of the call has caller ID compatible devices, the caller ID information is displayed to the recipient while the phone is ringing. This allows the recipient to decide whether or not to answer the call based on the caller ID information and can prevent the recipient from being surprised by the identity of the caller upon answering the phone.

More recently, caller ID functionality has been incorporated into devices that are not generally considered to be telephone related. For example, by using the telephone connection of an attached modem, computers have been configured to display caller ID information on a computer monitor. This can allow a user of the computer to view the caller ID information to decide whether or not to interrupt their use of the computer to retrieve a telephone and answer the call. Another example is the incorporation of caller ID functionality with television sets and television set-top boxes. Some television manufacturers incorporate telephone jacks on the back of new television sets for the purpose of receiving caller ID information from a connected line. When a call is detected by the television on the incoming line, the television displays any received caller ID information on the television screen. This information is typically presented to a television viewer by overlaying the information on the output of the television in a corner of the screen so as not to interrupt viewing of the material. A viewer can then conveniently decide whether to discontinue viewing the television in order to answer the call or to continue watching. Television set-top boxes can add this functionality to televisions that do not have it built in. Many set-top boxes include telephone jacks for downloading updated software, downloading program guides, uploading pay per view purchases, etc. The caller ID information can be read by the set-top box, and sent to the television display.

The caller ID compatible devices discussed above operate with PSTN telephone lines. Many consumers now, however, are choosing to forego subscribing to a fixed landline telephone service in favor of relying solely on wireless telephone access. Merely transmitting incoming wireless caller ID information to, and displaying this information on, a home television display, however can be undesirable if the owner of the phone is instead, for example, traveling or at their office. Caller ID information would needlessly be displayed, distracting viewers from the material they are watching. What is needed then are devices, systems, and methods for providing similar caller ID features for wireless subscribers while addressing the additional issues presented by the mobile nature of wireless communication devices.

SUMMARY OF THE INVENTION

A system according to the present invention for selectively displaying mobile caller identification (MCID) information for an incoming mobile telephone call on one or more display devices based on a location of the destination mobile device can include an MCID server and a subscriber database. The MCID server can be configured to receive an indication for an incoming call destined for a mobile communication device. The MCID server can also be configured to query the subscriber database based on the incoming call indication to determine if MCID information should be transmitted to a display device based on a location of the destination device. The incoming call indication can include the destination number of the mobile communication device, the origination number of the device placing the call, and/or the location of the destination device. The MCID server can be configured to query a location server to obtain the location of the mobile communication device. The query can be made using the destination number of the destination device.

The subscriber database can include a display identifier and a display location. The MCID server can determine that the incoming call indication should be transmitted to the display based on a comparison of the location of the destination device and the display location.

The subscriber database can include a display identifier and a display condition. The MCID server can determine that the incoming call indication should be transmitted to the display based on whether the location of the destination device meets the display condition.

The MCID server can be configured to query a caller ID database to obtain caller ID information for an origination number of the call.

One embodiment of a system according to the present invention includes an MCID waypoint and a display device. The MCID waypoint can be configured to receive MCID information for an incoming call destined for a mobile communication device. The MCID information can include a location of the mobile communication device. The waypoint can be further configured to query a set of location based delivery settings. The location based delivery settings can include at least one display identifier and corresponding location criteria. The MCID waypoint can be configured to selectively transmit an MCID indication to the at least one display based on the result of the query of the delivery settings. The display device can be configured to receive the MCID indication from the MCID waypoint and to display a message corresponding to the received MCID indication.

The MCID waypoint can include a voice over Internet protocol (VoIP) gateway. The display can be configured to receive the message via an internet protocol (IP) formatted message, or via a PSTN interface.

A method according to the present invention for selectively displaying MCID information for an incoming mobile telephone call on one or more display devices based on a location of the destination mobile device can include obtaining a location of the destination mobile device, comparing the location of the destination mobile device to an MCID display condition for a display device, and transmitting MCID information to the display device if the condition is met. The method can further include receiving an incoming call indication including the destination number of the destination mobile device and querying a memory to obtain the MCID display condition. Comparing the location of the destination mobile device to an MCID display condition for a display device can include comparing the location of the destination of the mobile device to the location of the display device and a radius. The location of the destination mobile device and the display device can be expressed as a latitude and longitude data.

The scope of the invention also includes computer readable memory including instructions for causing one or more processors to perform the methods of the present invention.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
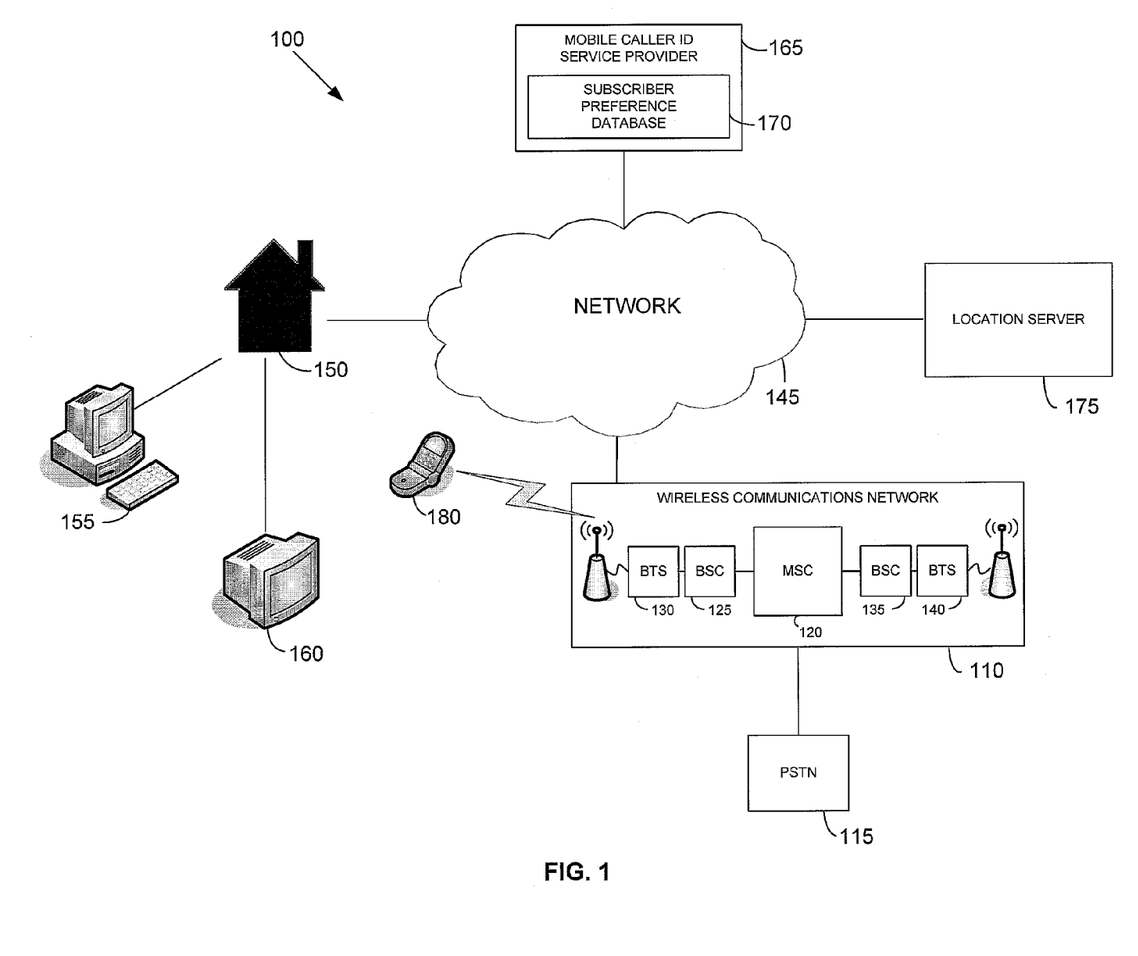
FIG. 1 is a block diagram of a system for providing location based mobile caller identification service to a home, according to the present invention.

Referring now to the drawings in which like numerals indicate like elements throughout the several views, FIG. 1 depicts a block diagram of a system 100 according to the present invention. The illustrated system 100 includes a wireless communication network 110. The illustrated wireless communications network 110 includes a mobile switching center (MSC) 120, which can be operatively linked to one or more base station controllers (BSC) 125, 135. The BSCs 125, 135 can in turn be operatively linked to one or more base transceiver stations (BTS) 130, 140, which are operatively linked to antennas for radiating transmitted signals and for receiving incoming signals. The wireless communications network 110 can be in communication with a public switched telephone network (PSTN) 115. The wireless communications network can include other elements as known in the art such as signaling network elements, a visitor location register, a home location register, an equipment identity register, and an authentication center. The type of air interface used and wireless technology (TDMA, CDMA, GSM, WCDMA, CDMA2000, etc.) employed on the wireless communications network can be of any type known in the art.

The wireless communication network 110 can be connected to a network 145 such as the Internet. It should be understood that the connections of FIG. 1 can be made via wired or wireless communication links, and that such connections can be made via the Internet, or other networks such as wide area networks or local area networks.

A home 150 can be connected to the Internet using any connection type such as, but not limited to, digital subscriber line (DSL), coaxial cable, fiber optic cable, T1, T3, satellite, or any combination thereof, and the like. The home 150 can have one or more display devices such as a television 160 and a monitor of a personal computer 155. Additional display devices not shown can include liquid crystal display (LCD), light-emitting diode (LED) display, plasma displays, organic LED displays, or other displays known in the art that can be placed throughout the home 150 as standalone devices or as part of other devices such as home appliances. The home 150 can include a local area network (LAN) interconnecting one or more personal computers 155. Other devices can be connected to the LAN such as the television 160 and other display devices. Connections to the home LAN can be made using wired connections or wireless connections such as IEEE 802.x standards (WiFi), WiMax, and BLUETOOTH.

A mobile caller identification (MCID) service provider 165 can be in communication with the network 145 and can include a subscriber preference database 170. A location server 175 can also be connected to the network 145. It should be understood that the network 145 can include a plurality of networks such as one or more LANs, and/or wide area networks, and that these networks can include public networks (such as the internet), and private networks. The connections to the network 145 shown on FIG. 1 indicate that the elements can communicate via a network connection. Due to various network configurations, it is possible that one or more of the elements can not communicate with each of the others. In the following description, it should be understood that network connections are configured so as to allow the communications between the elements as described.

A mobile device 180 can communicate with the wireless communication network 110 to place and receive calls. According to the present invention, incoming calls to the mobile device 180 can cause the wireless communications network 110 to send an incoming call indication to the MCID service provider 165 that the mobile device 180 is being called. The indication can include the wireless telephone number of the device 180 (destination number), and the telephone number of the device placing the call to the mobile device 180 (origination number). The indication can be sent from the MSC 120 (or some other element in the wireless network) to the MCID service provider 165.

Upon receipt of the incoming call indication, the MCID service provider 165 can query the subscriber preference database 170 to determine if the subscriber preference database 170 includes a listing for the destination number sent to the MCID service provider 165 from the wireless communications network 110. The subscriber preference database 170 can include records of subscribers that have registered for the MCID service. The subscriber preference database 170 can also include one or more option settings for delivery of caller ID information for incoming calls to the mobile device 180. Option settings will be discussed in more detail below. The subscriber preference database 170 can also include information associating mobile telephone numbers with MCID accounts as well as information regarding whether the account associated with a given mobile telephone number is active and/or currently in good standing.

If the wireless telephone number of the mobile device 180 being called is located in the subscriber preference database 170 and the account is in good standing, the option settings for the account can be queried to determine if caller ID information for the origin number should be delivered to one or more display devices and/or MCID waypoint devices associated with the account. If the option settings indicate that the caller ID information should be delivered, the MCID service provider 165 can then initiate a query of the location server 175. The location server 175 can communicate with the wireless communications network 110 in order to determine the location of the mobile device 180. Alternatively, location information for the mobile device 180 can be received at the MCID service provider 165 from the wireless communications network 110 in the incoming call indication.

Location of the mobile device 180 can be determined in a number of ways. The location of the mobile device 180 can be determined using triangulation techniques. Triangulation methods comprise measuring signal characteristics to determine a location of the device. Time of arrival of signals from network base stations to the device can be used as well as time or arrival of signals from the device to network base stations. In addition, other parameters of the signal can be used including, but not limited to, signal phase, signal strength, and which of a plurality of directional antennas of a base station is receiving the strongest signal from the device. Triangulation techniques are also employed in global positioning system (GPS) based location techniques. In the case of GPS, signal parameters from a plurality of orbiting satellites are measured to determine a location of the device. In the case of a dual mode (e.g., GSM/WiFi) mobile device, the location information can be obtained if the dual mode device registers on the WiFi network. The location information can be obtained in this case because of the short-range nature of WiFi communications. By registering with a given network, the location of the mobile device is known to be within the communication range of that WiFi network.

Two standards for measuring mobile device location have emerged in the United States in response to an FCC mandate for location information on mobile devices to deliver enhanced 911 services. These are uplink difference time of arrival (U-TDOA) and assisted GPS (A-GPS). The present invention can be implemented using these and other mobile device location determining schemes.

In addition to the robust techniques listed above, simpler techniques can be used to determine a relative location between the mobile device and a person, place, or object. For example, a short-range radio beacon such as a BLUETOOTH radio can be used to communicate with BLUETOOTH capable devices. By merely establishing communication between the two BLUETOOTH radios, the mobile device can be made aware that it is close enough to the external BLUETOOTH radio to be within its communication radius. Another example of this location technique is the use of a car cradle, home charger, or any device that physically interfaces with the mobile communication device 180. When the mobile device 180 is interfaced with, for example, the car charger, the mobile device 180 can be made aware that it is in a car. The present invention can be implemented using this location determining scheme as well. In this case, the mobile device 180 will report the location condition to the wireless communications network 110 which can pass this information on to the MCID service provider 165. The location of the mobile device 180 may also be determined by the most recent cell the mobile device 180 was in and/or the cells that the mobile device 180 is likely to travel.

The transfer of location information between system elements can be the result of various processes depending on the capabilities and functionality of the mobile device 180. These processes include, for example, a query of an on-board GPS receiver of the mobile device 180, a request by the location server 175 for location information from the wireless communications network 110, or a periodic "push" of location information to the location server 175. The location information can take any form sufficient to identify the location of the user, such as, x and y coordinate data, or latitude and longitudinal data.

In some embodiments, location information can be provided to the MCID service provider 165 in the initial incoming call indication from the wireless communications network 110. In addition, it should be understood that the location server 175 can be part of the wireless communications network 110 and interconnected therewith via a private network.

The MCID service provider 165 uses the location of the mobile device 180 to determine which, if any, of the display devices associated with the account should receive the caller ID information for display. The option settings in the subscriber preference database can indicate that if the mobile device 180 is in or near the home 150, that caller ID information should be delivered to display devices 155 and 160. In the example shown in FIG. 1, the mobile device 180 is located at the home 150. Accordingly, the MCID service provider 165 delivers the caller ID information for the origination number to these displays.

Figure 2:
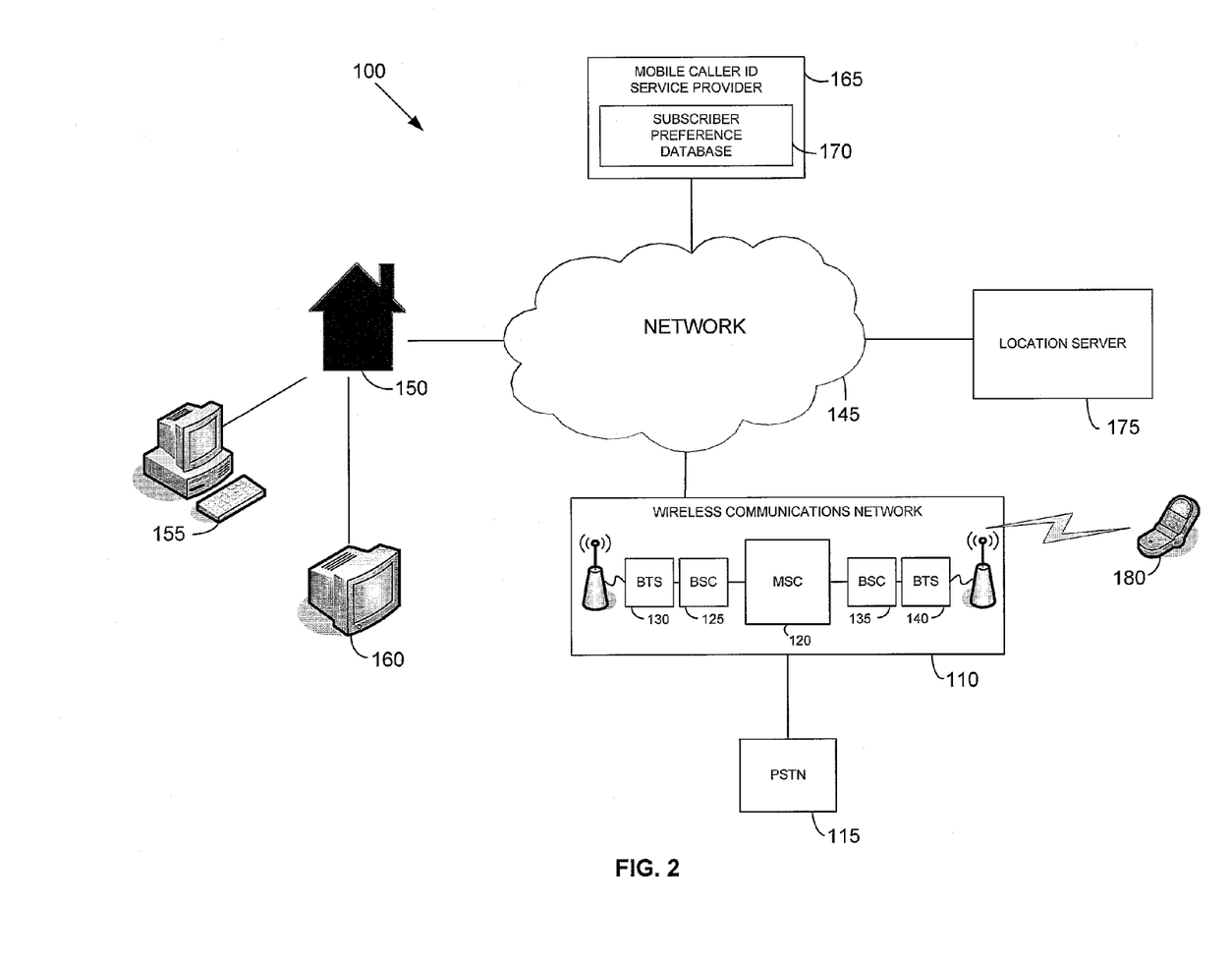
FIG. 2 is a block diagram of a system for providing location based mobile caller identification service to a home where the mobile caller identification customer is located away from the home, according to the present invention.

Referring now to FIG. 2, the mobile device 180 is shown at a location away from the home 150. In this case, the caller ID information for origination numbers calling the mobile device 180 are not displayed on the display devices 155, 160 located at the home 150, for example. It is contemplated, however, that a subscriber preference may be set such that these numbers are displayed on display device 155, 160.

Figure 3:
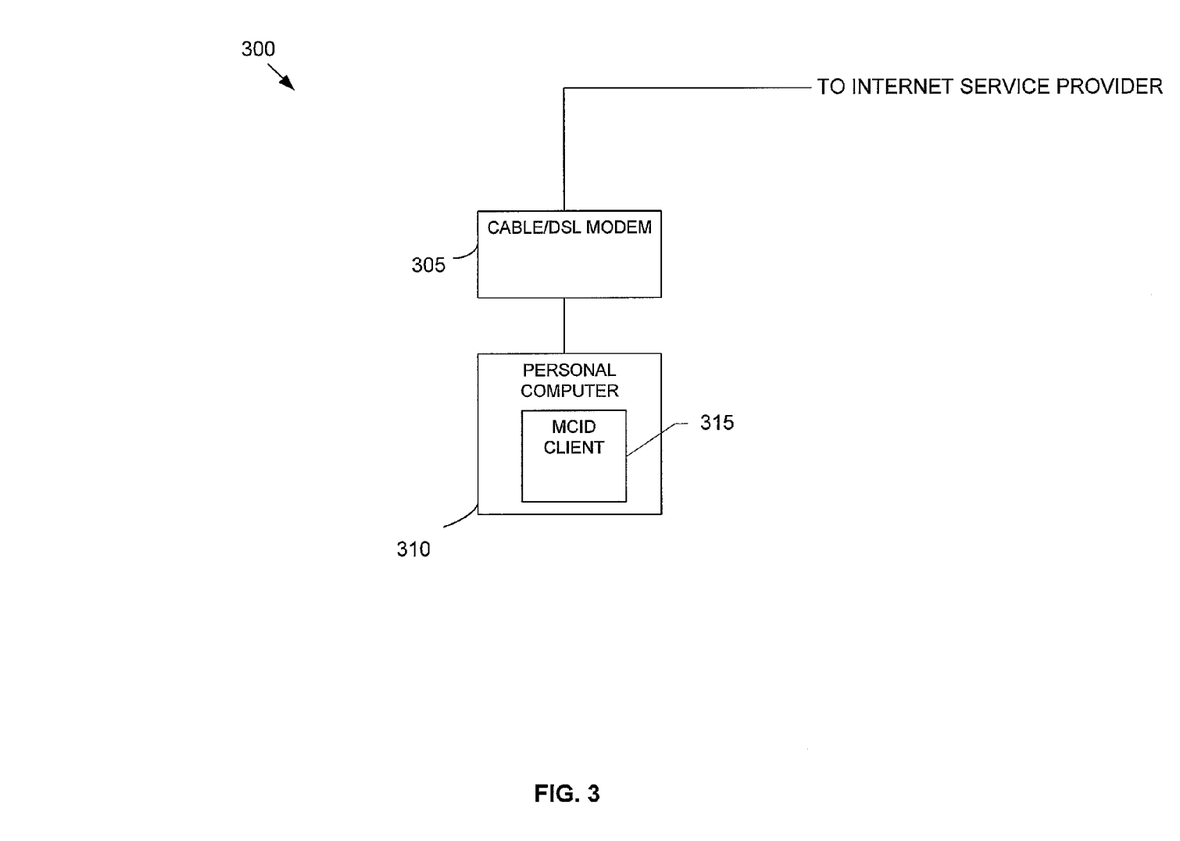
FIG. 3 is a block diagram illustrating an embodiment of a home network that can be used for delivering mobile caller identification information to the home, according to the present invention.

FIG. 3 depicts a home network configuration 300 that can be used to implement the present invention. A network connection from an Internet service provider enters the home 150 and is connected to cable/DSL modem 305. The type of modem 305 corresponds to the type of network connection that is entering the home 150. It is also contemplated that the network connection entering the home 150 can be a fiber optic connection, in which case a suitable interface would be used in place of cable/DSL modem 305. A personal computer 310 is connected to the cable/DSL modem 305 via conventional techniques such as Ethernet or USB. An MCID client 315 can be installed in the computer readable memory of the personal computer 310. The MCD client 315 includes instructions that cause the personal computer 310 to listen for MCID messages from an MCID service provider 165. When the MCID service provider 165 sends MCID information to the home 150, the information can pass to the personal computer 310 which receives the message and displays the MCID information on a display of the personal computer 310. The MCID client 315 can include option settings for further instructing the personal computer 310 how to display the information and under what circumstances it is to be displayed. These option settings can be in addition to any option settings located on the subscriber preference database 170. Option settings located in the subscriber database 170 can apply to all MCID delivery locations associated with a given account. Option settings located on the MCID client 315 can apply to MCID information delivered to the home 150. It should be understood that any properly configured IP addressable device can be substituted for the combination of the personal computer 310 and the MCID client 315. For example, a television with a network connection that includes necessary programming via software or firmware to recognize and display incoming MCID information can be connected to the cable/DSL modem 305. In addition, such devices can be connected to a cable/DSL modem 305 through a router (not shown). Such a network connected television can further used, for example, to receive video broadcasts carried via IP packets over the Internet.

Figure 4:
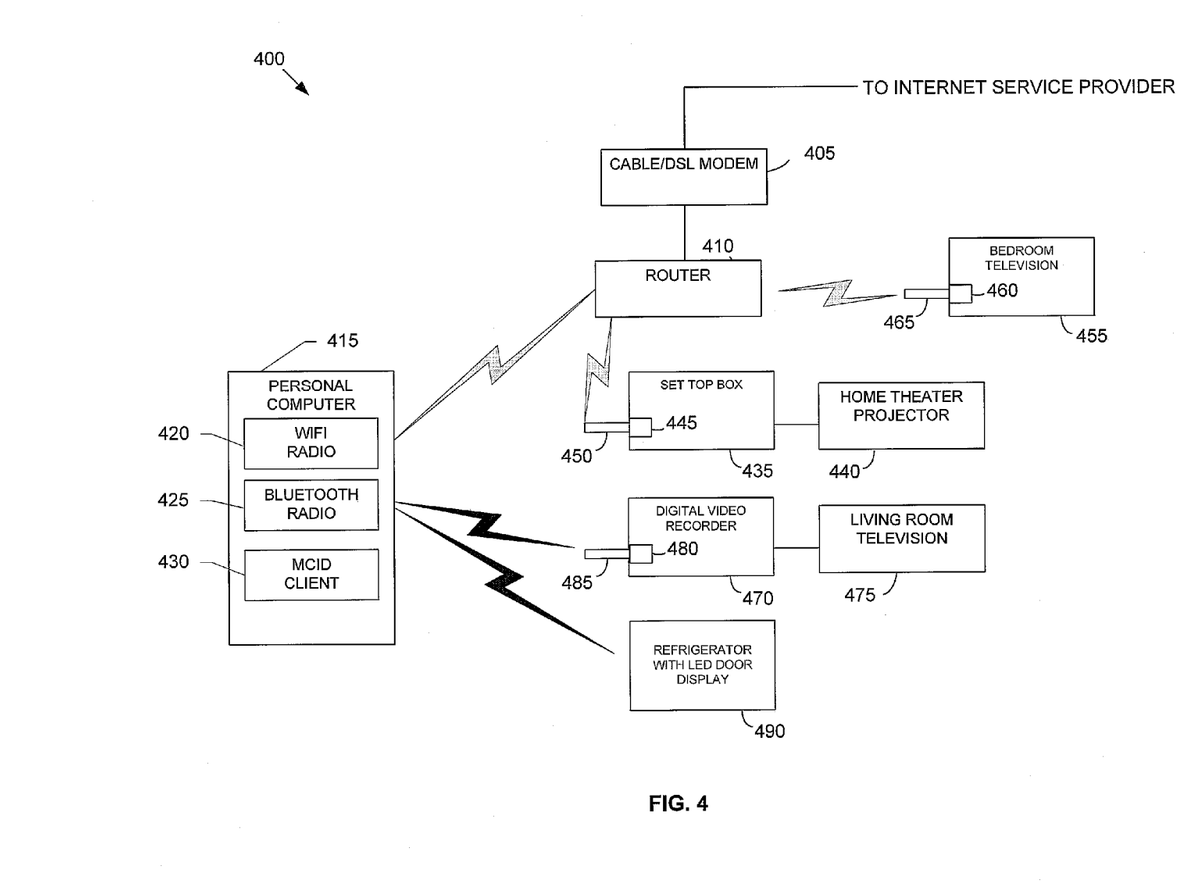
FIG. 4 is a block diagram illustrating an embodiment of a home network that can be used for delivering mobile caller identification information to the home including a router, according to the present invention.

FIG. 4 depicts a home network configuration 400. An internet network connection enters the house 150 and connects to a cable/DSL modem 405. A router 410 is connected to the cable/DSL modem 405 via conventional techniques such as Ethernet or USB. The router 410 can be a wireless router such that it includes a WiFi radio and/or a BLUETOOTH radio, for example. For the example configuration shown in FIG. 4, the wireless router 410 includes a WiFi radio. A personal computer 415 includes a WiFi radio 420, which can allow it to communicate with other devices having a WiFi radio as is known in the art. The personal computer 415 can also include a BLUETOOTH radio 425, which can allow the personal computer 415 to communicate with other devices having a BLUETOOTH radio as is known in the art. An MCID client 430 can be installed on the personal computer 415.

A set-top box 435 providing video input to a home theater projector 440 can include a USB port 445 in which WiFi USB adapter 450 is inserted. The WiFi USB adapter can enable the router 410 to communicate with the set-top box 435. Likewise, a bedroom television 455 can include a USB port 460 and a WiFi USB adapter 465 to enable the router 410 to communicate with the bedroom television 455. A digital video recorder 470 providing video to a living room television 475 can include a USB port 480 into which BLUETOOTH USB adapter 485 can be inserted. The BLUETOOTH USB adapter 485 can enable the personal computer 415 to communicate with the Digital Video Recorder 470. A refrigerator 490 can include a built-in BLUETOOTH radio that enables the personal computer 415 to communicate with the refrigerator 490.

In the configuration of FIG. 4 the MCID client 430 can receive MCID information from an MCID service provider 165 and distribute the information to the various display devices located throughout the home 150. MCID information can be forwarded to WiFi enabled devices from the personal computer 415 via the router 410. MCID information can be forwarded to BLUETOOTH enabled devices from the personal computer 415 using the BLUETOOTH radio 425. The devices 435, 440, 455, 470, 475 and 490 can be configured to display the MCID information received from the MCID client 430 on the personal computer 415. The MCID client 430 can include option settings for distributing MCID information across the devices. For example, the MCID device can be configured to only display two telephone numbers on the home theater projector 440, but to display all telephone numbers on the LED display of the refrigerator 490. MCID option settings can be configured via an interface on the personal computer 415. Many older devices such as set-top boxes, digital video recorders and televisions might not include USB ports, while including telephone jacks such as an RJ-11 jack. In this case, it can be preferable to use communication devices that are able to interface with these telephone jacks. In such cases, the telephone jack interface devices can receive MCID information from the MCID client 430 and mimic the operation of the PSTN caller ID. The use of such interface devices can allow older set-top boxes, digital video recorders, televisions, and other display devices to receive MCID information. Alternatively, a PSTN modem of the personal computer 415 can provide a telephone jack which can be used to interface with display devices having telephone jacks. Inserting telephone jack interface devices into the only telephone jack available on a display device can prevent that device from communicating via the PSTN 115, which may be necessary to purchase pay-per view programs, update software, and update interface data. Where a connection to the PSTN 115 is still required, a telephone jack adapter that allows two telephone jack devices to be connected to a single telephone jack can be used. Such devices are commonly available.

In the configurations shown in FIGS. 3 and 4, the MCID clients 315, 430 (respectively) receive MCID information from the MCID service provider 165. In the configuration shown in FIG. 4, the MCID client 430 on the personal computer 415 functions as an MCID waypoint. That is, the MCID client 430 receives MCID information and distributes that information for display on one or more devices (including its own monitor). A device referred to herein as an MCID waypoint can function in a similar manner without requiring an MCID client to be installed on a personal computer (that is left powered on) for MCID information to be received and distributed throughout a home.

Figure 5:
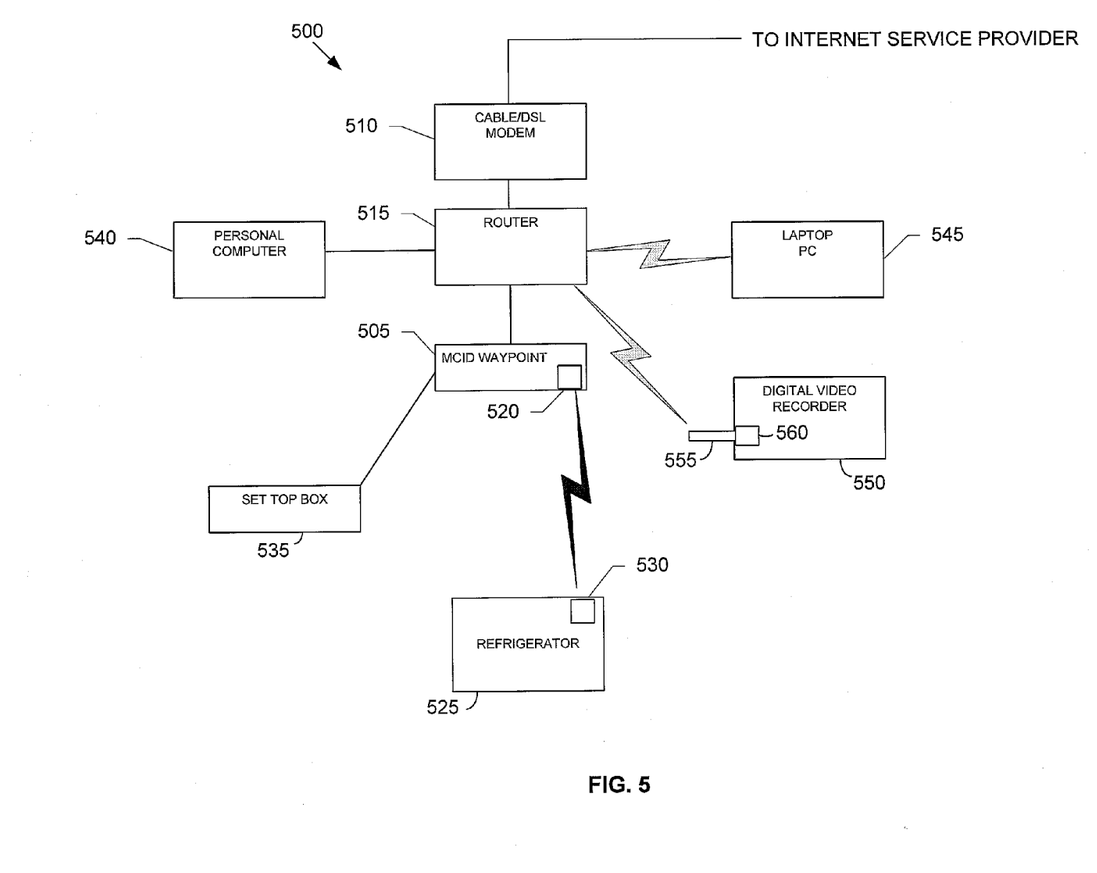
FIG. 5 is a block diagram illustrating an embodiment of a home network that can be used for delivering mobile caller identification information to the home including a mobile caller identification waypoint, according to the present invention.

FIG. 5 shows a home network configuration 500 which includes an MCID waypoint device 505. An Internet connection enters the home 150 and connects to a cable/DSL modem 510. A wireless router 515 can connect to the cable/DSL modem 510 via conventional techniques such as Ethernet or USB. An MCID waypoint 505 can connect to the router 515 via Ethernet or wireless Ethernet, WiFi or other conventional techniques known in the art. MCID waypoint 505 can include a BLUETOOTH radio 520 for communicating with BLUETOOTH devices such as a refrigerator 525 having a BLUETOOTH radio 530. The MCID waypoint 505 can include one or more telephone type jacks that can be used to connect to telephone jacks on devices such as a set-top box 535. The MCID waypoint 505 can communicate with the personal computer 540 via the router 515. The MCID waypoint 505 can also communicate with a laptop pc 545 and a digital video recorder 550 via the router 515. The router 515 can include WiFi which can communicate with a WiFi radio built into the laptop PC 545 and a WiFi USB adapter 555 inserted into a USB port 560 of the digital video recorder 550. The MCID waypoint 505 can receive MCID information from an MCID service provider 165 and distribute the MCID information through the home 150. MCID information can be provided to the personal computer 540, the laptop pc 545, and the digital video recorder 550 via router 515. MCID information can be provided to a display of the refrigerator 525 via BLUETOOTH. MCID information can be provided to set-top box 535 via a telephone jack connection that mimics PSTN caller ID where a telephone cable is used to connect the set-top box 535 and the MCID waypoint 505. Alternatively, a device can be inserted into a telephone jack of the set-top box 535 that includes a radio receiver. This radio receiver can be of any type known in the art including, but not limited to, BLUETOOTH, WiFi, and a radio utilizing cordless telephone frequencies. The device inserted into the telephone jack can be configured to receive MCID information from a transmitter in the MCID waypoint 505. The device inserted into the telephone jack can receive the MCID information and can mimic PSTN caller ID operation by outputting a signal on its male telephone jack plugged into the set-top box 535. The set-top box 535 can be configured to display PSTN caller ID information, and the mimicked PSTN operation can cause the set-top box 535 to display the MCID information.

Voice over Internet protocol (VoIP) comprises technologies that allow voice calls to be placed over the Internet. Instead of using the PSTN to route a call, VoIP encloses voice data in IP packets for transmission over the internet. Using gateways between the PSTN and the Internet, VoIP technologies can complete a call to, or receive a call from PSTN devices. VoIP can allow users to discontinue local phone service through a traditional regional bell operating company (RBOC) or competitive local exchange carriers (CLECs). A subscription from a VoIP provider can be required to obtain VoIP. To use VoIP service in the home, a user can use an Internet connected personal computer with a microphone and speakers to act as a telephone. More recently, VoIP gateways have become available which are internet addressable devices that can also interface with traditional telephone devices located in the home. These devices allow a VoIP service to map a telephone number to the device and cause the traditional telephone devices in the house to make and receive calls just as if they were connected to the PSTN.

Figure 6:
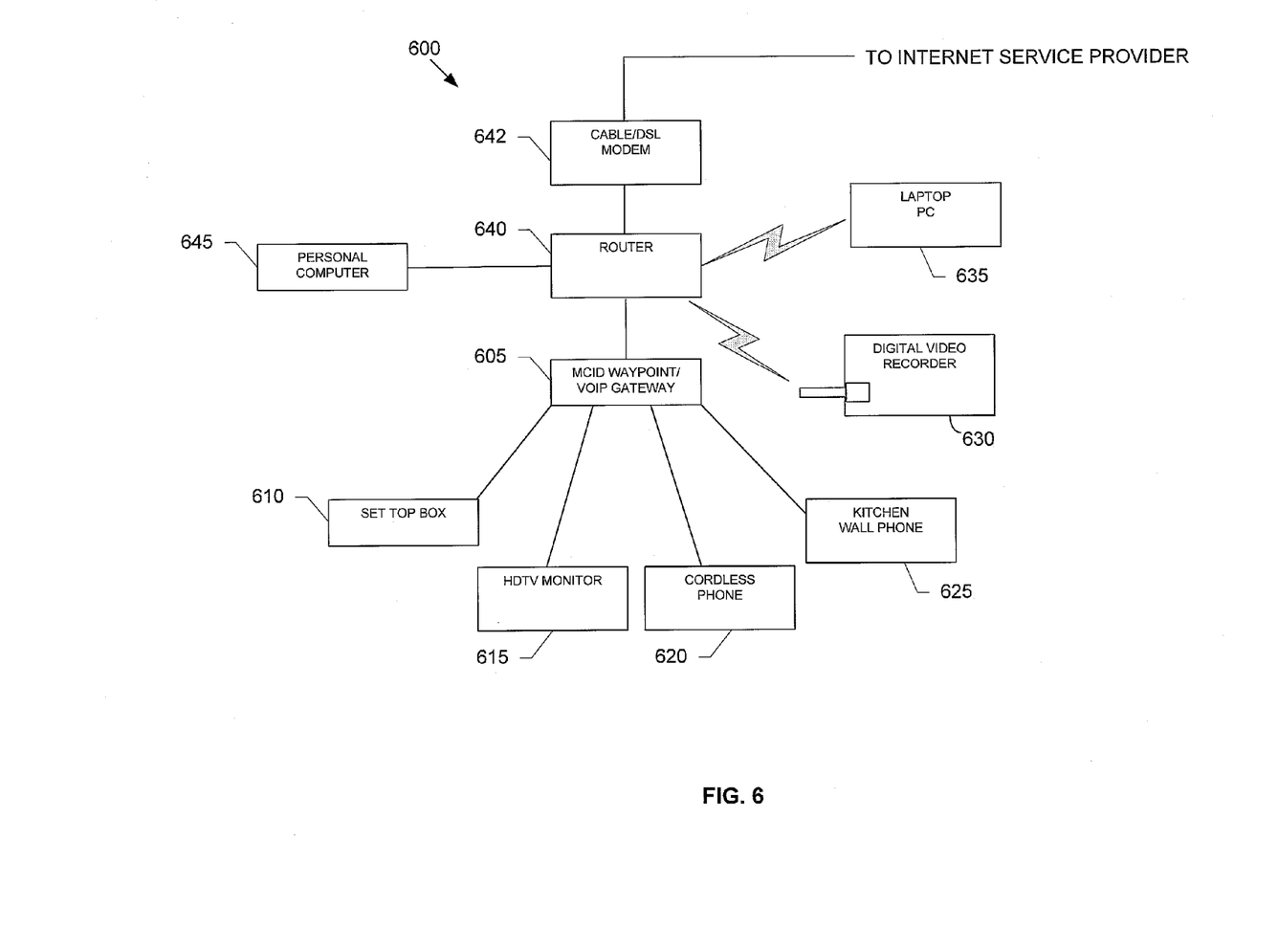
FIG. 6 is a block diagram illustrating an embodiment of a home network that can be used for delivering mobile caller identification information to the home including a combined mobile caller identification waypoint and a voice over internet protocol gateway, according to the present invention.

FIG. 6 shows a home network configuration 600 including a combined MCID waypoint and VoIP gateway 605. An Internet connection enters the home 150 and connects to cable/DSL modem 642. A wireless router 640 can connect to a cable/DSL modem 642 via conventional techniques such as Ethernet or USB. The combined device 605 can interface with devices such as a set-top box 610, a high definition monitor 615, a cordless telephone 620, and a corded telephone 625, each having PSTN interfaces. These devices can place and receive telephone calls using the VoIP gateway portion of the combined device 605. In addition, the MCID waypoint portion of the device 605 enables the device to deliver MCID information to these devices as described above with regard to FIG. 5. The MCID waypoint portion of the device 605 can additionally communicate with a digital video recorder 630, a laptop pc 635, and a desktop pc 645 as described above.

The MCID waypoint 505 (FIG. 5) and the combined MCID waypoint and VoIP gateway 605 can be configured using a personal computer 540, 645 (respectively). They can also be configured using a laptop PC 545, 635 (respectively). Accessing an IP address corresponding to the devices 505, 605 using a browser of a personal computer can cause the browser to display a configuration webpage stored in the memory of the devices 505, 605. The webpage can permit a user to alter configuration and option settings for the devices. In addition, as mentioned above option settings for MCID information can also be stored on subscriber preference database 170. FIGS. 7-10 will present examples of configuration webpages and option settings located at an MCID service provider 165. It should be understood that these webpages could instead be served from an MCID waypoint. Option settings can also be entered in other ways besides the use of a web interface. For example, the option settings can be input from the mobile device 180 or via a remote control such as one used to control an IPTV. It should also be understood that the examples are not limiting and that there are many other possibilities available that will come to the mind of one of ordinary skill in the art upon reading the disclosure contained herein. Furthermore, it should be understood that option settings can be stored at the subscriber preference database 170 or in an MCID waypoint 505 or both. Settings stored in an MCID waypoint 505 can be specific to the location where the waypoint 505 is installed. However, the waypoint 505 can be configured to collect option settings via its web interface and transfer these option settings to the subscriber preference database where they can be applied to other locations and other MCID waypoints. While the examples of FIGS. 1-6 depict configurations involving a home 150, it should be understood that MCID waypoints (either standalone or MCID clients on personal computers) can be placed at other locations such as, but not limited to, a mobile subscriber's place of employment.

Figure 7:
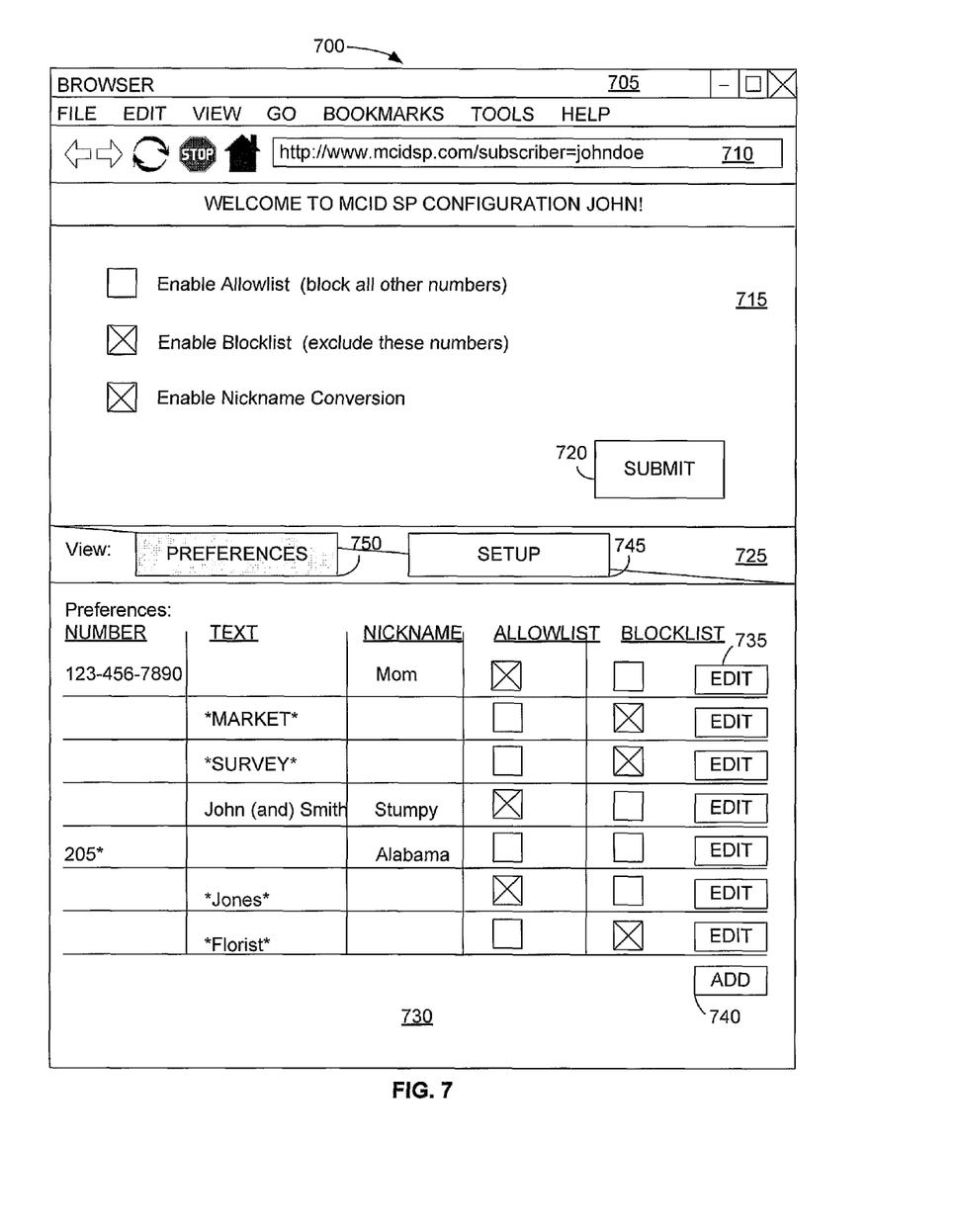
FIG. 7 shows a preferences view of an example configuration screen for a mobile caller identification service, according to the present invention.

FIG. 7 shows an example configuration interface 700 that can be used to make option settings for an MCID account. The interface of FIG. 7 is depicted as a web based interface. A web browser 705 is directed to a URL 710 associated with an MCID service provider (e.g., MCID service provider 165). Upon first attempting to access the address, the web based interface can request a username or account identifier and a password before granting access to a user. A quick settings portion 715 can accept user selections as to whether an allowlist, a blocklist, and a nickname list are enabled. An allowlist can be a list of telephone numbers and/or caller ID text that is allowed to be displayed on display devices by an MCID waypoint at the exclusion of numbers and text that are not included in the allowlist. A blocklist can include a list of telephone numbers and/or caller ID text that should not be delivered by an MCID waypoint to a display device. Choices on the quick settings list can be saved by selecting a submit button 720. A view selection bar 725 can accept selections from a user in order to change the mode of the lower area 730. A preferences screen is shown in the lower area 730. The preferences screen shows a listing of telephone numbers and text contained in the subscriber preference database 170. By way of example, telephone number 123-456-7890 is shown as having an associated nickname of "Mom". This number is selected to be included on the allowlist for the account. An edit button 735 can be selected by a user to cause the interface to display a more detailed list of selections associated with the number 123-456-7890. The following entry contains "market*" in the text field. This entry is marked as being placed on the blocklist. The asterisks can represent wildcards so that caller ID information for a call including "market" in its text should not be shown on MCID display devices. This can, for example, prevent the display of telemarketing calls. Likewise, the next entry excludes calls that have "survey" in their text so that telephone survey calls should not be displayed. It is unlikely that telemarketing and survey firms will associate their telephone numbers with text that includes these terms and such firms generally do not call mobile telephones, but these examples are given to show how caller ID information containing certain strings can be blocked from display on MCID displays. It should be understood that the mobile device associated with the destination number will still "ring" will the alert chosen on that device for incoming calls. The settings shown in FIG. 7 affect the display of MCID information on MCID displays and do not function as a call filter for the mobile device itself. Other entries in the list include a nickname association of "Stumpy" with calls that include both the strings "john" and "smith" where a Boolean operator is used to denote that both terms must be present for the nickname to be displayed. An entry of "205*" associate with the nickname "Alabama" can cause all incoming calls with the area code "205" to display "Alabama" on MCID devices. The number, nickname, and/or original caller ID text can be displayed on the MCID devices. The entry "florist*" blocks the display of MCID information for calls that contain the text "florist". This can be desired, for example, if the owner of the mobile device associated with the MCID account has purchased a surprise gift of flowers for a family member and does not want the surprise ruined by the display of MCID information for a confirmation call from the florist to the mobile device. An add button 740 can be used to add additional entries. A setup button 745 and a preferences button 750 are also provided.

Figure 8:
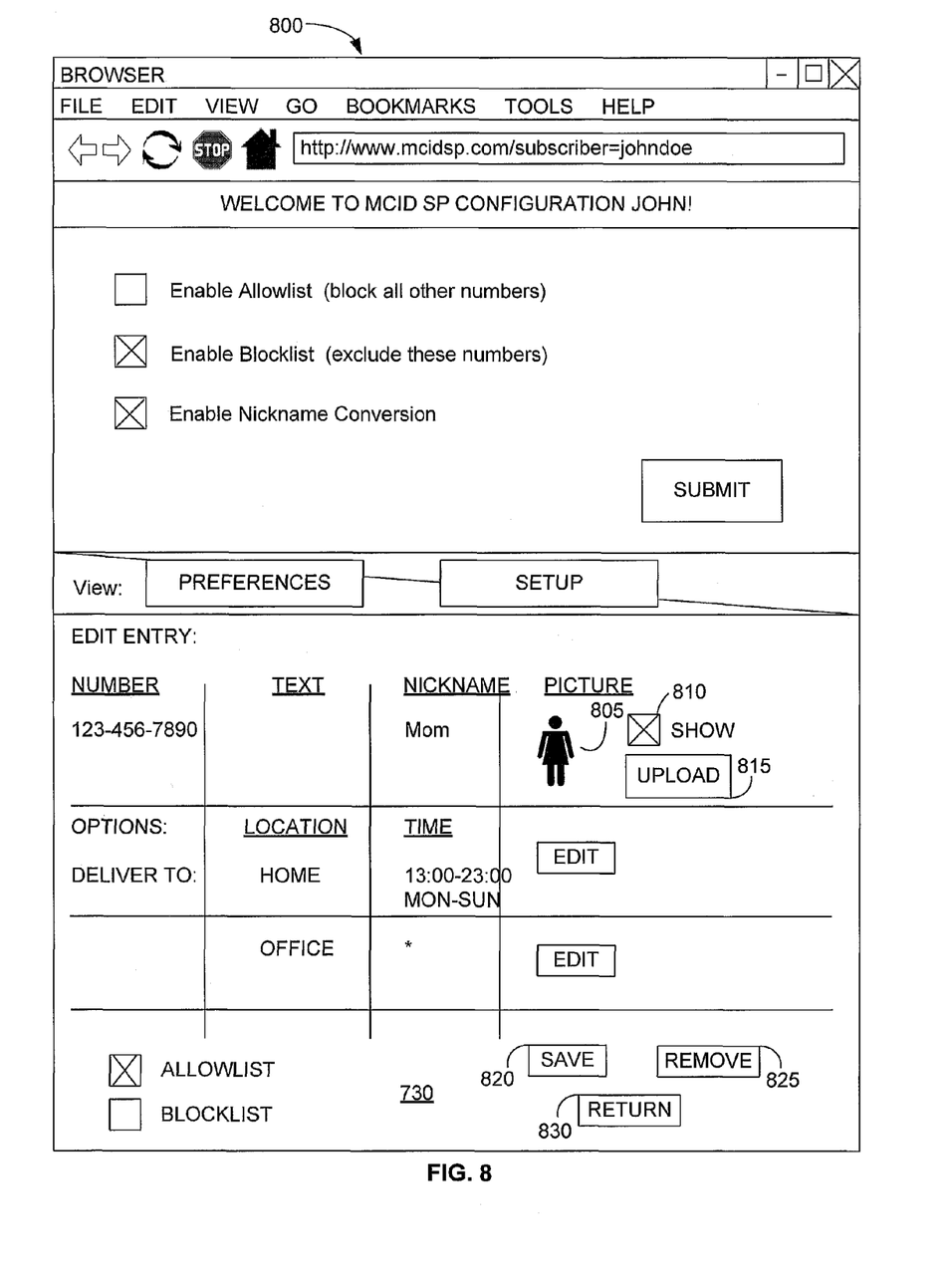
FIG. 8 shows an edit entry view of an example configuration screen for a mobile caller identification service, according to the present invention.

FIG. 8 shows an interface screen 800 that can be displayed upon the selection of an edit button 735 of FIG. 7. Additional options for the telephone number 123-456-7890 are displayed. A picture 805 is shown as stored with the telephone number 123-456-7890. A "show" checkbox 810 is selected to indicate that the picture 805 should be displayed along with MCID information when a call from 123-456-7890 is received. An "upload picture" button 815 can be selected to allow for the upload of a different picture for display. Delivery option settings are also shown for the telephone number. These can be location specific delivery options such as day of week and time of day delivery options set for locations such as "home" and "office". A save button 820 can cause the selections to be saved. A remove button 825 can delete the number from the database. A return button 830 can cause the lower display portion 730 to return to the main preferences page.

Figure 9:
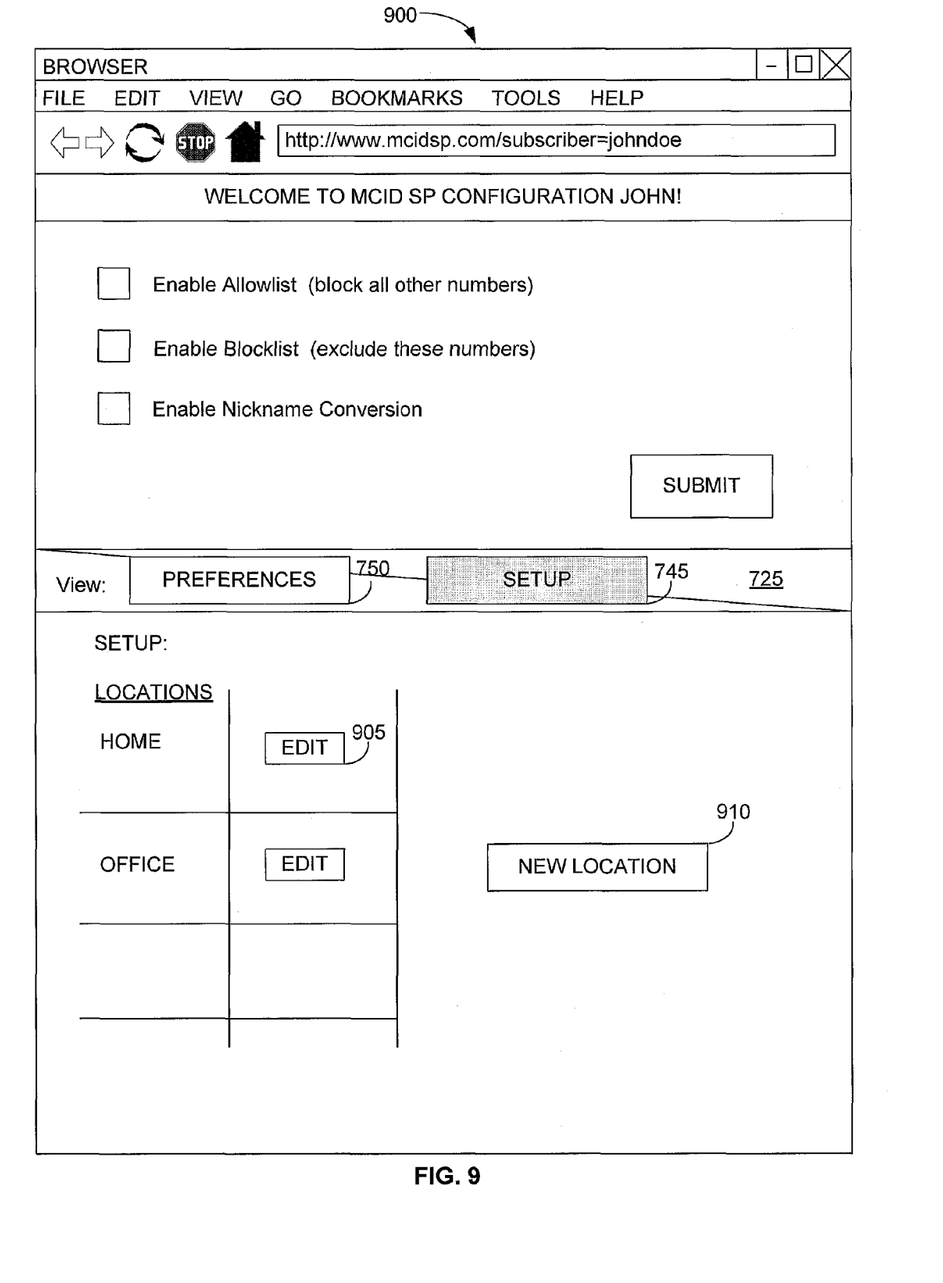
FIG. 9 shows a setup view of an example configuration screen for a mobile caller identification service, according to the present invention.

FIG. 9 shows an interface screen 900 that can be displayed upon the selection of the setup button 745. The setup screen can show locations that have been associated with the MCID account. On the display shown, two locations have been configured, home and office. Settings for the home location, for example, can be changed by selecting the edit button 905. New locations can be added by selecting the new locations button 910.

Figure 10:
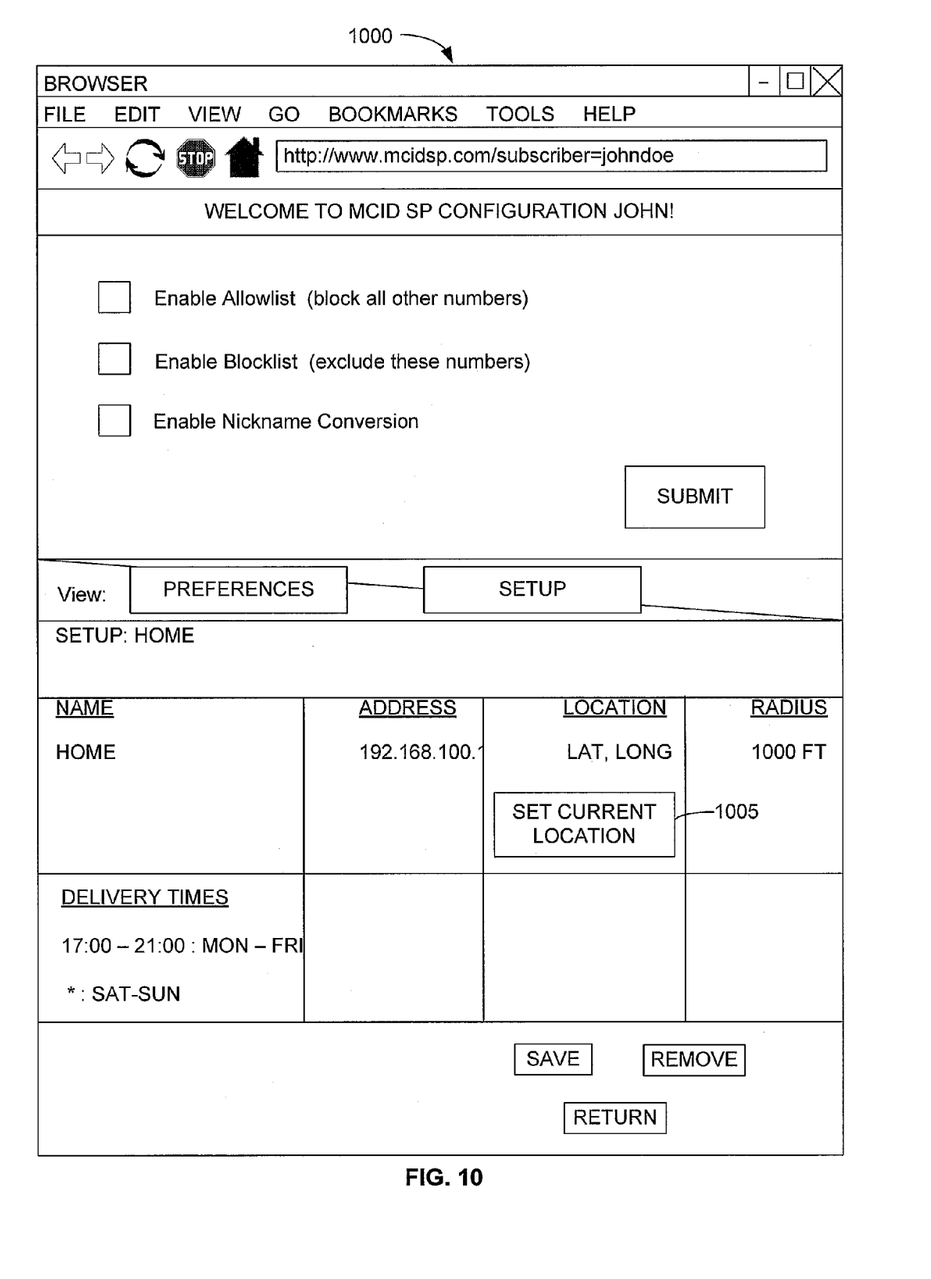
FIG. 10 shows a location edit view of an example configuration screen for a mobile caller identification service, according to the present invention.

FIG. 10 shows an interface screen 1000 that can be displayed upon the selection of the edit button 905 of FIG. 9. The name, address, location, delivery radius, and delivery times for the home location are displayed. The address can be the IP address assigned to the home by the Internet service provider. The location can be the latitude and longitude of the location. The latitude and longitude along with the radius can define an area where the mobile device 180 must be located for the MCID service provider 165 to delivery MCID information to the home 150. The delivery times can define time windows during which the MCID service provider 165 should deliver MCID information to the home. A "set current location" button 1005 can cause the MCID service provider 165 to query the location server 175 to obtain current location information for the mobile device 180. This can be helpful if the user does not know the latitude and longitude of a given location.

Figure 11:
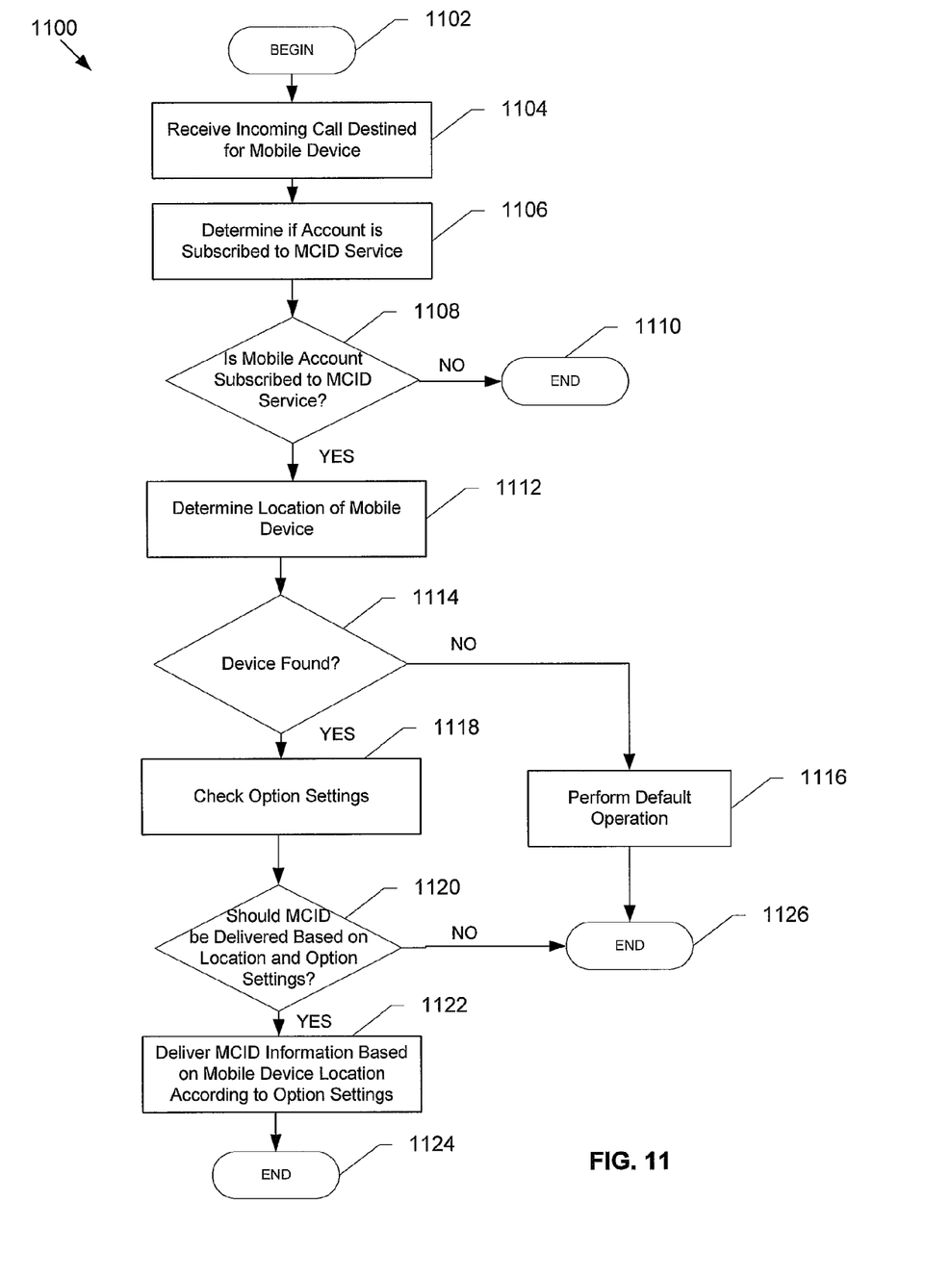
FIG. 11 is a flowchart of a method for providing location based mobile caller identification, according to the present invention.

FIG. 11 is a flowchart of an exemplary method 1100 according to the present invention. The method 1100 begins at step 1102 and proceeds to step 1104 where an incoming call intended for a mobile device is received. This can occur for example, at a network element of a wireless communication network. At step 1106, a determination is made regarding whether the account associated with the mobile device is subscribed to an MCID service. This can occur, for example, at an MCID service provider. At step 1108, if the account is not subscribed to an MCID service, the method 1100 ends at step 1110. If the account is subscribed to an MCID service, operation proceeds to step 1112 where the location of the mobile device is determined. At step 1114, if the mobile device is not found a default operation is performed at step 1116, and the method 1100 ends at step 1126. The default operation can be to not deliver the MCID information, or it can be to log the MCID information with a device not found error. If the device is found at step 1114, operation proceeds to step 1118 where the option settings for the MCID account are checked. At decision step 1120, if the option settings indicate that the MCID information should not be delivered based on the location of the device, and/or various option settings, the method 1100 ends at step 1126. If the option settings indicate the MCID information should be delivered based on the location of the device, the MCID information is delivered at step 1122 according to the option settings for the determined location, and the method 1100 ends at step 1124.

The present invention has been illustrated in relation to particular embodiments which are intended in all respects to be illustrative rather than restrictive. Those skilled in the art will recognize that the present invention is capable of many modifications and variations without departing from the scope of the invention. The law does not require and it is economically prohibitive to illustrate and teach every possible embodiment of the present invention. Hence, the above-described embodiments are merely exemplary illustrations of implementations set forth for a clear understanding of the principles of the invention. Variations, modifications, and combinations may be made to the above-described embodiments without departing from the scope of the invention. All such variations, modifications, and combinations are included herein by the scope of this disclosure.

The invention claimed is:
1. A system comprising:
a processor; and
a computer-readable storage medium having stored thereon instructions that, when executed by the processor, cause the processor to perform operations comprising:
receiving an incoming call indication of an incoming call addressed to a destination mobile communication device, the destination mobile communication device being associated with a mobile caller identification service account, the mobile caller identification service account identifying a location of a display device to which mobile caller identification information associated with incoming calls addressed to the destination mobile communication device can be transmitted;
determining whether mobile caller identification information associated with the incoming call should be transmitted to the display device, the determining comprising querying a subscriber database, using information from the incoming call indication, to obtain the location of the display device from the mobile caller identification service account, comparing the location of the display device to a location of the destination mobile communication device, and determining whether the mobile caller identification information should be transmitted to the display device based on results of the comparing of the location of the destination mobile communication device and the location of the display device obtained from the mobile caller identification service account in the subscriber database; and transmitting to the display device the mobile caller identification information associated with the incoming call.

2. The system of claim 1, wherein the instructions, when executed by the processor, cause the processor to perform further operations comprising determining the location of the destination mobile communication device.

3. The system of claim 1, wherein the incoming call indication includes the location of the destination mobile communication device.

4. The system of claim 1, wherein the information from the incoming call indication includes a destination number of the destination mobile communication device.

5. The system of claim 1, wherein the instructions, when executed by the processor, cause the processor to perform further operations comprising querying a caller identification database to obtain caller identification information corresponding to an origination number of a device initiating the incoming call.

6. The system of claim 1, wherein the instructions that when executed by the processor, cause the processor to perform determining whether the mobile caller identification information should be transmitted to the display device based on the location of the destination mobile communication device, cause the processor to perform comparing the location of the destination mobile communication device to a location within a radius of the location of the display device.

7. The system of claim 1, wherein the instructions that, when executed by the processor, cause the processor to perform determining whether the mobile caller identification information should be transmitted to the display device based on the location of the destination mobile communication, cause the processor to perform determining whether the destination mobile communication device is in communication with a short range radio beacon.

8. The system of claim 1, wherein the instructions that, when executed by the processor, cause the processor to perform determining whether the mobile caller identification information should be transmitted, further cause the processor to perform checking an option setting that is associated with the destination mobile communication device and that corresponds to the location of the destination mobile communication device.

9. The system of claim 1, wherein the mobile caller identification service account comprises at least one option setting selected from a group of option settings comprising:

an allow list used to identify at least one telephone number that is allowed to be displayed on the display device;

an allow list used to identify at least one caller identification text that is allowed to be displayed on the display device;

a block list used to identify at least one telephone number that is not allowed to be displayed on the display device;

a block list used to identify at least one caller identification text that is not allowed to be displayed on the display device;

a picture option used to assign a picture to a telephone number;

a delivery option used to identify a day of week and time of day during which delivery of the mobile caller identification information to the display device is allowed; and a location option used to define the location of the display device in terms designated by a user associated with the mobile caller identification service account.

10. A method comprising:

receiving, at a mobile caller identification server, an incoming call indication of an incoming call addressed to a destination mobile communication device, the destination mobile communication device being associated with a mobile caller identification service account, the mobile caller identification service account identifying a location of a display device to which mobile caller identification information associated with incoming calls addressed to the destination mobile communication device can be transmitted;

determining, by the mobile caller identification server, whether mobile caller identification information associated with the incoming call should be transmitted to the display device, the determining comprising querying a subscriber database, using information from the incoming call indication, to obtain the location of the display device from the mobile caller identification service account, comparing the location of the display device to a location of the destination mobile communication device, and determining whether the mobile caller identification information should be transmitted to the display device based on results of the comparing of the location of the destination mobile communication device the location of the display device obtained from the mobile caller identification service account in the subscriber database; and transmitting, by the mobile caller identification server, the mobile caller identification information associated with the incoming call to the display device.

11. The method of claim 10, wherein determining whether the mobile caller identification information should be transmitted further comprises checking an option setting that is associated with the destination mobile communication device and that corresponds to the location of the destination mobile communication device.

12. The method of claim 10, further comprising determining the location of the destination mobile communication device.

13. The method of claim 10, wherein the incoming call indication includes the location of the destination mobile communication device.

14. The method of claim 10, wherein determining whether the mobile caller identification information should be transmitted to the display device based on the location of the destination mobile communication device comprises comparing the location of the destination mobile communication device to a location within a radius of the location of the display device.

15. The method of claim 10, wherein determining whether the mobile caller identification should be transmitted to the display device based on the location of the destination mobile communication comprises determining whether the destination mobile communication device is in communication with a short range radio beacon.

16. The method of claim 10, wherein the mobile caller identification service account comprises at least one option setting selected from a group of option settings comprising:
- an allow list used to identify at least one telephone number that is allowed to be displayed on the display device;
- an allow list used to identify at least one caller identification text that is allowed to be displayed on the display device;
- a block list used to identify at least one telephone number that is not allowed to be displayed on the display device;
- a block list used to identify at least one caller identification text that is not allowed to be displayed on the display device;
- a picture option used to assign a picture to a telephone number;
- a delivery option used to identify a day of week and time of day during which delivery of the mobile caller identification information to the display device is allowed; and
- a location option used to define the location of the display device in terms designated by a user associated with the mobile caller identification service account.

17. A non-transitory computer-readable storage medium having stored thereon instructions that, when executed by a processor, cause the processor to perform operations comprising:
- receiving an incoming call indication of an incoming call addressed to a destination mobile communication device, the destination mobile communication device being associated with a mobile caller identification service account, the mobile caller identification service account identifying a location of a display device to which mobile caller identification information associated with incoming calls addressed to the destination mobile communication device can be transmitted;
- determining whether mobile caller identification information associated with the incoming call should be transmitted to the display device, the determining comprising
  - querying a subscriber database, using information from the incoming call indication, to obtain the location of the display device from the mobile caller identification service account,
  - comparing the location of the display device to a location of the destination mobile communication device, and
  - determining whether the mobile caller identification information should be transmitted to the display device based on results of the comparing of the location of the destination mobile communication device and the location of the display device obtained from the mobile caller identification service account in the subscriber database; and
- transmitting to the display device the mobile caller identification information associated with the incoming call.

18. The non-transitory computer-readable storage medium of claim 17, wherein the instructions that, when executed by the processor, cause the processor to perform determining whether the mobile caller identification information should be transmitted, cause the processor to check an option setting that is associated with the destination mobile communication device and that corresponds to the location of the destination mobile communication device.

19. The non-transitory computer-readable storage medium of claim 17, wherein the instructions, when executed by the processor, further cause the processor to perform determining, in response to determining that the destination mobile communication device is subscribed to the mobile caller identification service, the location of the destination mobile communication device.

20. The non-transitory computer-readable storage medium of claim 17, wherein the mobile caller identification service account comprises at least one option setting selected from a group of option settings comprising:
- an allow list used to identify at least one telephone number that is allowed to be displayed on the display device;
- an allow list used to identify at least one caller identification text that is allowed to be displayed on the display device;
- a block list used to identify at least one telephone number that is not allowed to be displayed on the display device;
- a block list used to identify at least one caller identification text that is not allowed to be displayed on the display device;
- a picture option used to assign a picture to a telephone number;
- a delivery option used to identify a day of week and time of day during which delivery of the mobile caller identification information to the display device is allowed; and
- a location option used to define the location of the display device in terms designated by a user associated with the mobile caller identification service account.

\* \* \* \* \*